United States Patent Office 3,234,305
Patented Feb. 8, 1966

3,234,305
THIOPHOSPHORUS ACID ESTERS
Hugo Malz, Leverkusen-Wiesdorf, Günter Oertel, Cologne-Flittard, Hans Holtschmidt, Cologne-Stammheim, and Kuno Wagner, Leverkusen-Bayerwerk, Germany, assignors to Farbenfabriken Bayer Aktiengesellschaft, Leverkusen, Germany, a German corporation
No Drawing. Filed Jan. 23, 1962, Ser. No. 168,252
Claims priority, application Germany, Feb. 1, 1961, F 33,106; Apr. 5, 1961, F 33,599
3 Claims. (Cl. 260—928)

Objects of this invention are novel phosphorus compounds of the general Formula I and processes for their production. The compounds of this invention are of interest in the field of pesticides especially in agriculture or veterinary medicine.

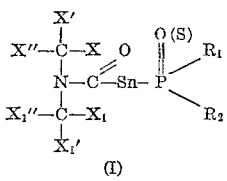

(I)

$n$ in the above formula is 0 or 1; X, X', X", $X_1$, $X_1'$ and $X_1''$ denote halogen or another group

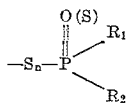

X, X', $X_1$, $X_1'$ may also stand for hydrogen; and $R_1$ and $R_2$ are the same or different, optionally substituted, hydrocarbon residues which may also be linked to the phosphorus atom via oxygen, sulfur or nitrogen atoms.

The compounds of this invention can be more particularly defined as:

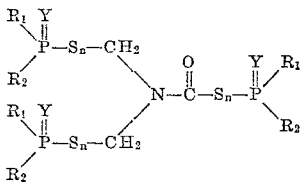

wherein $R_1$ and $R_2$ are lower alkyl, phenyl, lower alkoxy, lower alkyl amino, lower dialkylamino and phenoxy, $n$ is an integer from zero to one with the proviso that when all of $n$'s are zero at least one of $R_1$ and $R_2$ is one of lower alkoxy or phenoxy and Y is a chalkogen having an atomic weight less than 40.

The preparation of this novel class of compounds may be carried out in a manner known in principle, either by reacting thiol-group containing phosphorus compounds with carbamic acid chlorides of the general Formula II

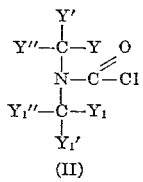

(II)

wherein Y, Y', Y", $Y_1$, $Y_1'$ and $Y_1''$ are intended to be halogen or hydrogen and wherein at least one halogen atom should be present per methyl group, or by reacting phosphorus compounds capable of undergoing the Arbuzov reaction with such carbamic acid chlorides.

When molar amounts of phosphorus compounds and carbamic acid chlorides are employed the reaction proceeds as follows:

(a) 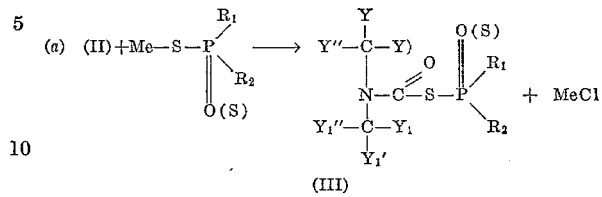

(III)

Me=alkali metal equivalent or $NH_4$, (b) 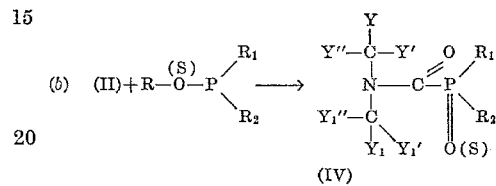

(IV)

It is of course also possible to use more than one mol of the phosphorus compound in relation to the carbamic acid chloride. In excess of the molar proportions of 1:1 stated in Equations $a$ and $b$, it is then possible to react the halogen atoms located on the methyl groups of the carbamic acid chloride (II) with the above mentioned phosphorus compounds. Compounds with the general Formula I are thus obtained, wherein the symbols X, X', X", $X_1$, $X_1'$ and $X_1''$ denote residues of the general formula

in accordance with the amount of phosphorus compounds employed in excess of the molar proportions 1:1.

The carbamic acid chlorides (II) to be employed in this reaction may, for example, be obtained according to the process described below for the production of bis-(chloromethyl)-carbamic acid chloride, but are also obtainable by the halogenation of corresponding dialkyl carbamic acid chlorides according to known processes. Since they represent very reactive compounds, it is advisable to carry out the production of the novel phosphorus compounds, as described here, in the presence of inert solvents or diluents. In this respect, hydrocarbons, ethers or ketones have proved particularly suitable. The reactivity of the halogen atoms in the carbamic acid chlorides (II) differs, in that the chlorine atom located on the carbonyl group reacts first—usually very vigorously—before the halogen atoms located on the methyl groups react. In general, it is therefore an advantage to moderate the first stage of the reaction, whose progress is usually strongly exothermal by cooling. Since the exchange of the halogen atoms located on the methyl groups in general takes place slowly, it is advisable to increase the speed of this reaction at the second stage by a corresponding increase in temperature in those cases where such reaction is in fact desired.

In accordance with this invention it has also been found that one possible starting material, the bis-(chloromethyl)-carbamic acid chloride of the formula $$(Cl-CH_2)_2N-COCl$$

which as yet has not been known, can be obtained by a simple method, by reacting hexamethylene tetramine with phosgene or with compounds splitting off phosgene at an elevated temperature, and when optionally operating this process in the presence of inert organic solvents.

Surprisingly, a fission of the hexamethylene tetramine ring takes place to form bis-(chloromethyl)-carbamic acid chloride.

As has already been mentioned above, instead of phosgene it is also possible to employ for the reaction those compounds which split off phosgene at an elevated temperature (say between 120° and 250° C.) and which in addition form no decomposition products which can react with hexamethylene tetramine. As examples of such compounds there may be mentioned oxalyl chloride and chloroformic acid trichloromethyl ester.

As solvents for this reaction there may be considered all inert organic solvents, which are normally employed for phosgenation. Aliphatic and aromatic hydrocarbons as well as their chlorination products in particular belong to this group. As examples there may be mentioned toluene, chlorobenzene, chloronaphthalene and chloroform.

The reaction is carried out at temperatures between 120° and 250° C., preferably between 150° and 230° C. When operating at essentially higher temperatures or even at room temperature, indefinite mixtures of various carbamic acid chlorides are obtained.

When the reaction is carried out in the absence of a solvent, operations are always carried out at an elevated pressure. When a solvent is employed, the reaction can be carried out without the application of pressure or also in a closed vessel. In general, there may be considered pressures of 1 to 250 atmospheres, preferably of 50 to 200 atmospheres. In carrying out this process at least 4 moles of phosgene or of a compound splitting off phosgene are employed per mole of hexamethylene tetramine. A certain molar excess of hexamethylene tetramine is quite suitable. Preferably, 8–12 moles of phosgene are employed per mole of hexamethylene tetramine. However, the phosgene may also be blown through the reaction mixture at any excess until the reaction is finished.

The reaction can, for example, also be carried out by reacting the components in an autoclave and by heating the latter with stirring, to the appropriate temperature, whereby a corresponding pressure is automatically established. In this event it is possible to operate in the presence of a solvent or in the absence of a solvent.

According to a special method of carrying out the stated process, hexamethylene tetramine is reacted with phosgene in the presence of a solvent at temperatures between about 20° and 100° C. During this perliminary reaction, the bis-(chloromethyl)-carbamic acid chloride is not yet formed, but a polymeric carbamic acid chloride. The solvent is then distilled off and the reaction product reacted at the higher temperature in accordance with the invention. Bis-(chloromethyl)-carbamic acid chloride is thereby formed.

Working up is carried out by known methods; the reaction mixture is preferably subjected to fractional distillation. The novel phosphorus compounds of the general Formula I obtainable according to the claimed process are produced either in the form of colorless to pale brown colored oils, which cannot be distilled without decomposition, or in the form of crystals. They are chiefly to be employed as plant protection agents.

The new compounds very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As examples for the special utility the compounds of the following formulae (I) 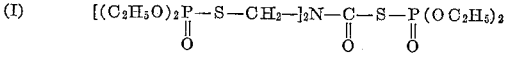

(II) 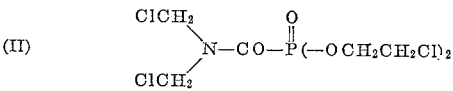

have been tested against caterpillars, spider mites (regarding their ovicidal activity) and regarding their nematicidal activity.

The tests have been carried out as follows:

(a) With compound I against caterpillars and spider mites (regarding its ovicidal activity): Aqueous dilutions of the above mentioned compound I have been prepared by mixing the active ingredient with the same amount of dimethyl formamide as an auxiliary solvent adding thereto 20% by weight of a commercial emulsifier consisting of a benzyl hydroxy polyglycol ether containing about 10 to 15 glycol residues, and diluting at last this premixture with water to the desired concentration indicated below.

White cabbage has been sprayed drip wet with aqueous emulsions as prepared above in the concentration as indicated below. Caterpillars (of the type diamondback moth, 10 each) have been placed on the sprayed leaves of the white cabbage. The living status has been determined after 24 hours and 48 hours. Caterpillars were killed completely with 0.01% solutions.

Bush beans (*Phaseolus vulgaris*) infested with about 100 eggs of *Tetranychus telarius* Hanst (two-spotted spider) are sprayed drip wet with aqueous emulsions as prepared above. Evaluation occur after 8 days. Each experiment has been rechecked after 14 days. Spider mites are killed completely with 0.01% solutions.

(b) And with compound II regarding the nematicidal activity: Soil infested with Phythopathogenic nematodes of the type *Meloidogyne incognita* was treated in Mitscherlich pots of 5 liters capacity with the above mentioned compound II in the quantity shown below. The pots were kept at 24° C. and planted with tomatoes and potatoes or sown with rye after 1 week; the evaluation of the tests was carried out after 5 weeks. The roots of the tomatoes were tested as to infestation by galls or cysts. The degree of efficiency calculated according to the Abbott formula was as follows: 100 p.p.m.=100%.

The following examples are given for the purpose of illustrating the present invention.

EXAMPLE 1

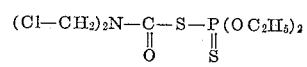

A solution of 22.4 grams of potassium O,O-diethylthiolthionophosphate in 100 ml. of acetone is added dropwise to a solution of 17.65 grams of bis-chloromethylcarbamic acid chloride in 100 ml. of acetone while stirring. The initially clear solution becomes turbid during the exothermal reaction as KCl separates. It is stirred for approximately another half hour at 30° C. and the separated KCl is then filtered off by suction on a Buchner funnel. The pale yellow filtrate is evaporated in vacuum. The oily product thereby obtained as residue is taken up in ether and washed twice with water. After being dried over sodium sulfate, the solvent is evaporated off, and there are obtained 31 grams of a light yellow, clear oil which cannot be distilled without decomposition.

Calculated for $C_7H_{14}O_3NPS_2Cl_2$: C, 25.8%; H, 4.3%; N, 4.3%; P, 9.5%; S, 19.6%; Cl, 21.8%. Found: C, 26.0%; H, 4.4%; N, 4.5%; P, 9.3%; S, 19.1%; Cl, 21.8%.

Biological activities

Caterpillars (diamondback moth) were killed completely with 0.1% solutions. Grain weevils were killed completely with 0.1% solutions. On spider mites (*Tetranychus telarius* Hanst) 0.1% solutions showed 100% ovicidal activity.

The bis-chloromethyl-carbamic acid chloride required as starting material can be obtained by the following method:

(*a*) 140 parts by weight of hexamethylene tetramine are charged into a cooled autoclave having a capacity of 1300 parts by volume and which already contains 1000 parts by weight of liquified phosgene. Thereafter, the mixture is heated with good stirring to 200° C. for 5 hours, when an excess pressure of 110 atmospheres becomes established. Thereafter, the excess of phosgene is blown off and the liquid, dark brown product is distilled off in vacuum. Bis-(chloromethyl)-carbamic acid chloride distils, without first runnings, at B.P. 95–97° C./15 mm. Hg. Yield: 246 parts.

The residue consists of 150 parts of a polymeric carbamic acid chloride.

*Analysis.*—Calc.: C, 20.4%; H, 2.17%; N, 7.93%; O, 9.1%; Cl, 60.4%. Found: C, 20.4%; H, 2.16%; N, 8.35%; O, 9.4%; Cl, 60.4%.

(*b*) 400 parts by weight of hexamethylene tetramine are dissolved with warming in 2000 parts by volume of chloroform. Phosgene is thereafter introduced. A vigorous reaction takes place, which causes the chloroform to boil. A white, viscous mass is obtained at first, which dissolves again after some time. After introducing phosgene for 6 hours, everything is dissolved without residue. After this preliminary reaction, the chloroform is distilled off, and the viscous reaction product is further phosgenated at 150–160° C.

After purging the product with nitrogen in order to remove the excess of phosgene, it is distilled in vacuum, and the bis-(chloromethyl)-carbamic acid chloride is obtained in a yield of 410 parts by weight.

EXAMPLE 2

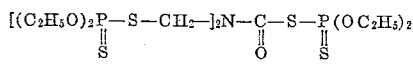

A solution of 8.8 grams of bis-chloromethyl-carbamic acid chloride in 50 ml. of acetone is added dropwise, with stirring, to a solution of 33.6 grams of potassium O,O-diethylthiolthionophosphate in 150 ml. of acetone. After subsiding of the initially strongly exothermal reaction the mixture is heated to boiling with stirring for approximately another ¼ hour, and the separated KCl is thereafter filtered off by suction at room temperature on a Buchner funnel. The light yellow filtrate is evaporated in vacuum, the oily residue then being taken up in ether and washed twice with water. After drying over sodium sulfate and evaporation of the ether, 29 grams of a light yellow oil are obtained.

Calculated for $C_{15}H_{34}O_7NP_3S_6$: C, 28.8%; H, 5.5%; N, 2.2%; P, 14.9%; S, 30.7%. Found: C, 29.0%; H, 5.6%; N, 2.5%; P, 14.6%; S, 29.8%.

By the same way there may be obtained the compound of the following formula

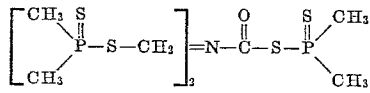

EXAMPLE 3

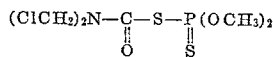

Equimolar amounts of bis-chloromethyl-carbamic acid chloride and potassium O,O-dimethylthiolthionophosphate are reacted in acetone, as solvent, by the method described in Example 1, and there is obtained a yellow oil, in more than 90% yield which cannot be distilled without decomposition.

Calculated for $C_5H_{10}O_3NPS_2Cl_2$: N, 4.7%; P, 10.4%; S, 21.5%; Cl, 23.8%. Found: N, 4.8%; P, 11.0%; S, 21.8%; Cl, 22.6%.

By the same way there may be obtained the compounds of the following formulae:

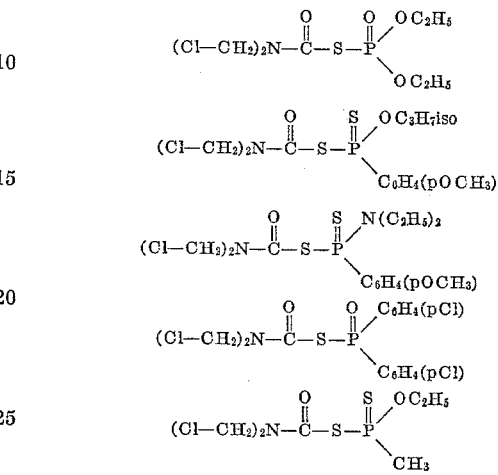

EXAMPLE 4

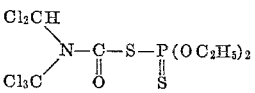

A solution of 22.4 grams of potassium O,O-diethyl-thiol-thionophosphate in 100 ml. of acetone is added dropwise, with stirring, to 28 grams of pentachloro-dimethyl-carbamic acid chloride, of B.P. 100–105° C./12 mm. Hg, dissolved in 150 ml. of acetone and prepared by chlorination of bis-chloromethyl-carbamic acid chloride. The initially clear solution is decolorized in a strongly exothermal reaction as KCl separates. Upon evaporation in vacuum a greasy residue is obtained which is taken up in warm ether. Colorless crystals separate on cooling the ether solution with $CO_2$. After filtering off with suction, these crystals are dried on porous pot. Colorless crystals with a pale pink shimmer and a melting point of 102° C. are thereby obtained. Yield 70% of the theoretical.

Calculated for $C_7H_{11}O_3NPS_2Cl_5$: C, 19.6%; H, 2.6%; N, 3.3%; P, 7.2%; S, 14.9%; Cl, 41.3%. Found: C, 19.7%; H, 2.6%; N, 3.5%; P, 7.5%; S, 15.1%; Cl, 41.2%.

EXAMPLE 5

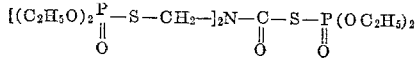

A solution of 8.8 grams of bis-chloromethyl-carbamic acid chloride in 50 ml. of acetone is added dropwise, with stirring, to a solution of 28.1 grams of ammonium O,O-diethylthiolphosphate in 150 ml. of acetone, and after heating to boiling for about ½ hour, it is worked up, as described in Example 2. A golden yellow, clear oil is thus obtained in about 85% yield.

Calculated for $C_{15}H_{34}O_{10}NP_3S_5$: C, 31.2%; H, 5.9%; N, 2.4%; P, 16.2%; S, 16.7%. Found: C, 30.9%; H, 5.9%; N, 2.6%; P, 15.9%; S, 15.9%.

Grain weevils are killed completely with 0.01% solutions. Caterpillars of the type diamondback moth are killed to 100% with 0.01% solutions. Ovicidal action o n*Tetranychus telarius* Hanst (two-spotted spider) is 100% with 0.01% solutions.

EXAMPLE 6

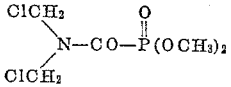

24.8 parts of trimethyl phosphite are added dropwise at 30–40° C. with cooling, to 35.5 parts of di-(chloromethyl)-carbamic acid chloride. A vigorous reaction ensues, with splitting off methyl chloride. After subsiding of the formation of heat, the reaction mixture is heated to 50° C. for 30 minutes and then to 100° C. for 15 minutes. Volatile constituents are distilled from the reaction product by briefly applying a vacuum at 100° C. In the residue, there remain 48 parts (96% of the theoretical) of the required ester in the form of a yellow oil which cannot be distilled without decomposition.

*Analysis.*—Molecular weight 250. Calculated: C, 24.0%; H, 4.0%; N, 5.6%; P, 12.4%. Found: C, 23.8%; H, 3.99%; N, 5.9%; P, 11.4%.

By the same way there may be obtained the compounds of the following formulae:

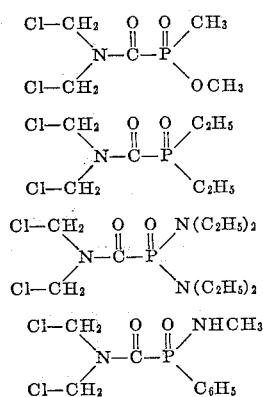

EXAMPLE 7

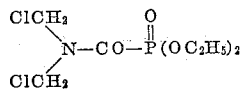

17.7 parts of di-(chloromethyl)-carbamic acid chloride are reacted with 16.6 parts of triethyl phosphite by the method described in Example 6. The reaction product is a clear, light yellow oil and is obtained in the theoretical yield (27.8 parts).

*Analysis.*—Molecular weight 278. Calc.: C, 30.2%; H, 5.0%; N, 5.0%; P, 11.3%. Found: C, 30.9%; H, 4.97%; N, 5.5%; P, 10.5%.

EXAMPLE 8

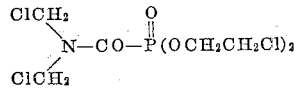

27 parts of tri-(chloroethyl)-phosphite are added dropwise at 60° C. to 17.7 parts of di-(chloromethyl)-carbamic acid chloride. When the exothermal reaction has subsided, the mixture is heated to 90° C. for two hours. The dichloroethane formed as a side product is thereafter distilled off in vacuum at 100° C. As a residue, there remain 34.5 parts of the required ester in the form of a light yellow oil.

The activity on caterpillars (*E. chrysorrhoea*) is 100% with 0.1% solutions. The nematicidal activity (*Meloidogyne inc.*) is 100% = 100 p.p.m.

EXAMPLE 9

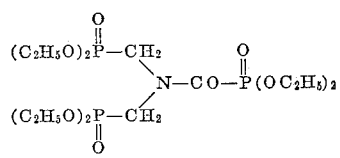

17.7 parts of di-(chloromethyl)-carbamic acid chloride are mixed at 60° C., whilst stirring, with 70 parts of triethyl phosphite. After the exothermal reaction has subsided, the mixture is heated to 100° C. until no further ethyl chloride escapes. Thereafter, the excess of triethyl phosphite is distilled off in vacuum at 100° C. In the residue, there remain 48 parts, 100% of the theoretical) of the required ester in the form of a colorless oil.

We claim:
1. A compound of the formula

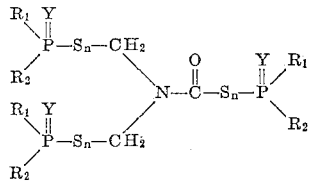

wherein $R_1$ and $R_2$ are selected from the group consisting of lower alkyl, phenyl, lower alkoxy, lower alkyl amino, lower dialkylamino and phenoxy, $n$ is an integer from zero to one with the proviso that when all of $n$'s are zero at least one of $R_1$ and $R_2$ is a member selected from the group consisting of lower alkoxy and phenoxy and Y is a chalkogen having an atomic weight less than 40.

2. A compound of the formula

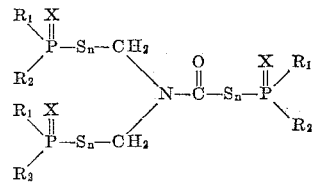

wherein $n$ is an integer from 0 to 1, $R_1$ and $R_2$ are lower alkoxy and X is a chalkogen having an atomic weight less than 40.

3. The compound of the following formula

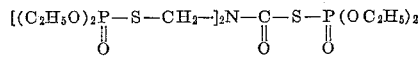

References Cited by the Examiner

UNITED STATES PATENTS

| | | | |
|---|---|---|---|
| 2,354,536 | 7/1944 | Nelson | 260—461 |
| 2,648,696 | 8/1953 | Whetstone | 260—461 |
| 2,909,558 | 10/1959 | Reetz | 260—461 |
| 3,009,940 | 11/1961 | Tilles | 260—461 |
| 3,044,981 | 7/1962 | Malz et al. | 260—461 X |

OTHER REFERENCES

Arbuzov et al.: "Bull. Acad. Sci. U.S.S.R., Div. Chem. Sci.," 1952, pp. 759–764.

Reetz et al.: "J. Am. Chem. Soc." (II), vol. 77, pp. 3813–3816 (1955).

CHARLES B. PARKER, *Primary Examiner.*

MORRIS LIEBMAN, *Examiner.*